United States Patent
Asai et al.

(10) Patent No.: US 8,926,399 B2
(45) Date of Patent: Jan. 6, 2015

(54) SUPPORT MATERIAL REMOVING METHOD

(75) Inventors: Yoshihisa Asai, Nagaoka (JP); Hiroshi Okura, Nagaoka (JP); Shinya Takano, Nagaoka (JP)

(73) Assignee: Macoho Co., Ltd., Niigata (JP)

( * ) Notice: Subject to any disclaimer, the term of this patent is extended or adjusted under 35 U.S.C. 154(b) by 140 days.

(21) Appl. No.: 13/336,634

(22) Filed: Dec. 23, 2011

(65) Prior Publication Data
US 2012/0238186 A1    Sep. 20, 2012

(30) Foreign Application Priority Data
Mar. 17, 2011    (JP) .................. 2011-059501

(51) Int. Cl.
*B24C 1/08*    (2006.01)
(52) U.S. Cl.
USPC ............ 451/38; 451/39; 451/40; 451/90; 451/102
(58) Field of Classification Search
USPC ............ 451/38, 39, 40, 75, 89, 90, 91, 102
See application file for complete search history.

(56) References Cited

U.S. PATENT DOCUMENTS

| | | | | |
|---|---|---|---|---|
| 5,065,551 A | * | 11/1991 | Fraser | 451/40 |
| 5,115,600 A | * | 5/1992 | Kataoka et al. | 451/75 |
| 5,201,150 A | * | 4/1993 | Kuboyama et al. | 451/88 |
| 5,325,639 A | * | 7/1994 | Kuboyama et al. | 451/39 |
| 5,533,922 A | * | 7/1996 | Yamaharu | 451/38 |
| 5,709,587 A | * | 1/1998 | Shaffer | 451/38 |
| 6,328,631 B1 | * | 12/2001 | Fukano et al. | 451/39 |
| 7,040,962 B2 | * | 5/2006 | Makino et al. | 451/39 |
| 8,049,136 B2 | * | 11/2011 | Mase et al. | 219/121.71 |
| 8,197,302 B2 | * | 6/2012 | Mase | 451/32 |
| 8,408,969 B2 | * | 4/2013 | Mase | 451/36 |
| 2005/0107006 A1 | * | 5/2005 | Makino et al. | 451/40 |
| 2009/0011682 A1 | * | 1/2009 | Mase | 451/38 |
| 2009/0068930 A1 | * | 3/2009 | Miyasaka | 451/39 |
| 2012/0094581 A1 | * | 4/2012 | Sharma | 451/38 |
| 2012/0231704 A1 | * | 9/2012 | Mase | 451/38 |

FOREIGN PATENT DOCUMENTS

JP    2011-005667 A    1/2011

* cited by examiner

*Primary Examiner* — Eileen P. Morgan
(74) *Attorney, Agent, or Firm* — Sughrue Mion, PLLC

(57) ABSTRACT

An object of the present invention is to provide a revolutionary support material removing method which exhibits operational effects not seen in conventional practice.

The present invention is a support material removing method for removing a support material (2) located on a surface (1*a*) of a three-dimensional object (1) molded by a three-dimensional forming device, wherein a slurry (5) which is a mixture of a liquid (3) and abrasive grains (4) is sprayed from a slurry sprayer (6) to remove the support material (2).

1 Claim, 6 Drawing Sheets

SUPPORT MATERIAL REMOVING METHOD

TECHNICAL FIELD

The present invention relates to a support material removing method for removing a support material on the surface of a three-dimensional object formed by a three-dimensional forming device.

BACKGROUND ART

In the past, there have been proposals of a three-dimensional forming device (commonly known as a 3D printer) which forms a three-dimensional object by an inkjet method, and a water jet method for removing by water-spraying pressure, for example, has commonly been used as the method for removing a support material on the surface of a three-dimensional object formed by this three-dimensional forming device. However, the problems with this method are that the support material cannot be sufficiently removed (some slipperiness remains on the surface of the three-dimensional object), large-scale equipment is needed such as high-output pumps and pipes for wastewater treatments, and high costs are incurred.

In view of this, a method (hereinbelow the conventional method) of soaking a three-dimensional object in a chemical solution to remove a support material has been proposed as disclosed in JP-A No. 2011-5667, for example, and the support material can be removed more satisfactorily in comparison with the previously described water jet method.

PRIOR ART DOCUMENTS

Patent Documents

[Patent Document 1] JP-A No. 2011-5667

DISCLOSURE OF THE INVENTION

Problems the Invention is Intended to Solve

However, the conventional method requires much time to remove the support material, there are cases in which sufficient removal is not possible due to the amount of the support material or the location of the support material (gaps, corners, and other locations where the support material does not come off easily with a chemical reaction alone), and handling of the chemical solution is also troublesome, such as during the process of removing the support material, of course, and also during the process of disposing of used chemical solution.

The inventors have repeatedly conducted various experimental research with the objective of resolving the problems with the conventional method previously described, and as a result, have developed a revolutionary support material removing method which yields operational effects not seen in conventional practice.

A summary of the present invention is described with reference to the accompanying drawings.

The present invention relates to a support material removing method for removing a support material 2 on the surface 1a of a three-dimensional object 1 molded by a three-dimensional forming device, the support material removing method characterized in that a slurry 5 which is a mixture of a liquid 3 and abrasive grains 4 is sprayed from a slurry sprayer 6 to remove the support material 2.

The support material removing method according to the first aspect is characterized in that the slurry sprayer 6 is configured having a spray slurry producer 7 for mixing compressed air supplied from a compressed air supplier 11 and the slurry 5 which is supplied from a slurry supplier 12 and drawn in through a slurry passage 8 by the compressed air.

The support material removing method according to the second aspect is characterized in that the slurry passage 8 is provided with a slurry outlet 9 for expelling some of the slurry 5.

The support material removing method according to a third aspect is characterized in that the slurry outlet 9 is provided to a position upstream of and near to the spray slurry producer 7.

The support material removing method according to the second aspect is characterized in that the slurry sprayer 6 is configured with a spray nozzle 14 for spraying a slurry 5 produced by the spray slurry producer 7, the spray nozzle 14 being detachably provided to a slurry spraying base 10 which is provided with the slurry passage 8 and the compressed air passage 13 through which the compressed air passes.

The support material removing method according to the third aspect is characterized in that the slurry sprayer 6 is configured with a spray nozzle 14 for spraying slurry 5 produced by the spray slurry producer 7, the spray nozzle 14 being detachably provided to a slurry spraying base 10 which is provided with the slurry passage 8 and the compressed air passage 13 through which the compressed air passes.

The support material removing method according to the fourth aspect is characterized in that the slurry sprayer 6 is configured with a spray nozzle 14 for spraying slurry 5 produced by the spray slurry producer 7, the spray nozzle 14 being detachably provided to a slurry spraying base 10 which is provided with the slurry passage 8 and the compressed air passage 13 through which the compressed air passes.

The support material removing method according to any of the second through seventh aspects is characterized in that a crank-shaped part 8a is provided to the slurry passage 8.

The support material removing method according to the first aspect is characterized in that columnar-shaped abrasive grains 4 are used as the abrasive grains 4.

The support material removing method according to a ninth aspect is characterized in that the abrasive grains 4 are approximately 0.1 to 0.5 mm in diameter and approximately 0.1 to 0.5 mm in height.

The support material removing method according to the first aspect is characterized in that abrasive grains 4 made of a resin are used as the abrasive grains 4.

Since the present invention is designed as described above, the support material can be removed more quickly and reliably than with the conventional method previously described, and since there is no need for a chemical solution treatment, the present invention is a revolutionary support material removing method whereby a support material removal treatment can be performed easily, and other operational effects not seen in conventional practice are also achieved.

BEST MODE FOR CARRYING OUT THE INVENTION

Figure 1:
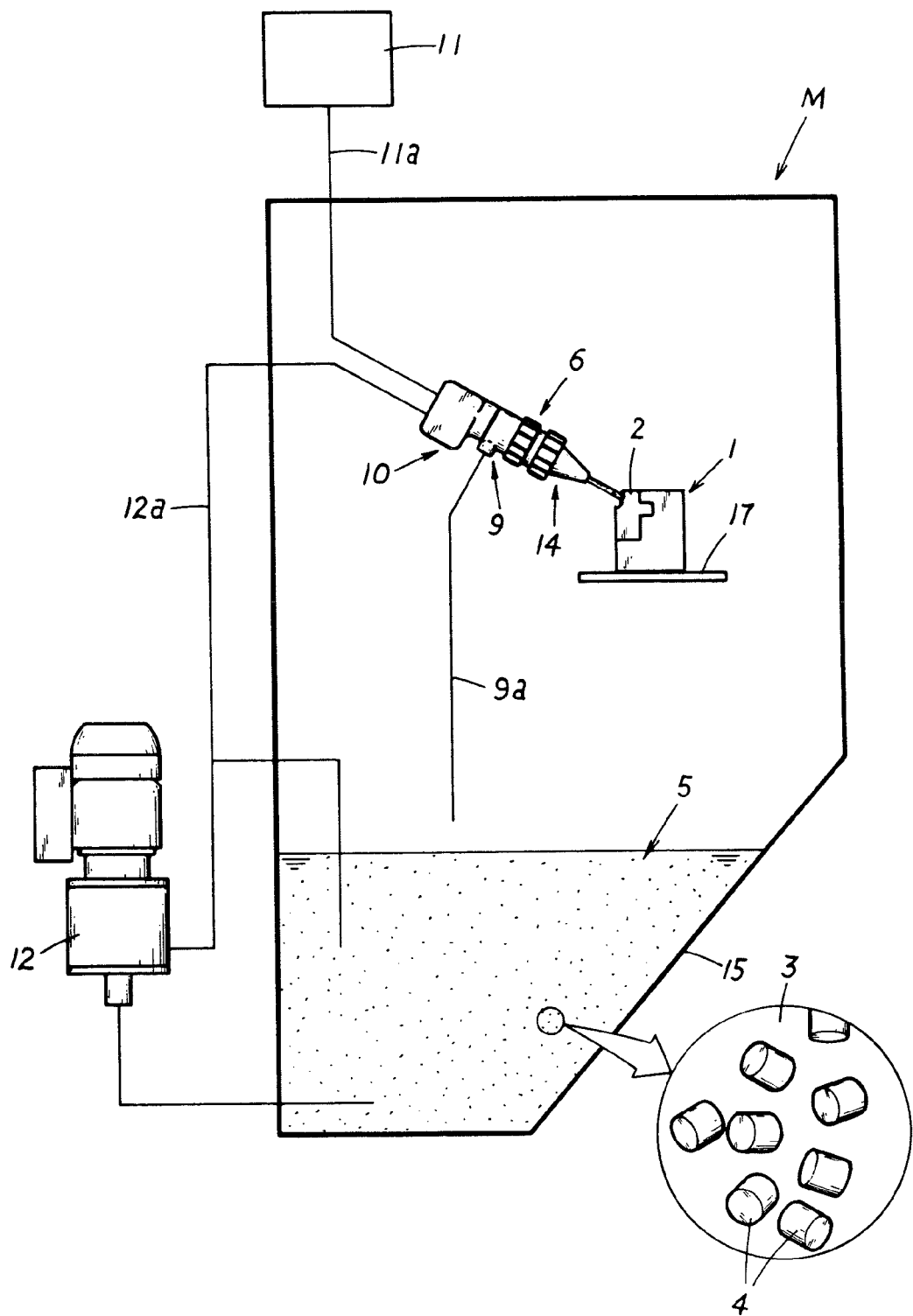
FIG. 1 is an explanatory drawing of a support material removing device used in the present example.

Preferred embodiments of the present invention are briefly described with reference to the diagrams while indicating the effects of the present invention.

A slurry 5, which is a mixture of a liquid 3 and abrasive grains 4, is sprayed from a slurry sprayer 6 onto a three-dimensional object 1 molded by a three-dimensional forming device and having a support material 2 on its surface 1a.

At this time, the abrasive grains 4 constituting the slurry 5 are carried by the liquid 3 to collide with the support material 2 located on the surface 1a of the three-dimensional object 1, and the support material 2 is satisfactorily removed by this collision with the abrasive grains 4.

Specifically, due to the scraping effect of the abrasive grains 4 in the slurry 5, clumped support material 2 located on the surface 1a of the three-dimensional object 1, for example, is of course removed, slipperiness that readily remains on the surface 1a of the three-dimensional object 1 (a thin film of remaining support material 2) can also be reliably removed, and the support material 2 is reliably removed also from locations where it had not come off easily in conventional practice (gaps and corners) by actively achieving the scraping effect in these locations (this has been confirmed by experimenting).

Consequently, according to the present invention, the support material 2 located on the surface 1a of the three-dimensional object 1 can be removed quickly, reliably, and easily.

In the present invention, to perform the surface treatment on the three-dimensional object 1 by spraying the slurry 5 which is a mixture of the liquid 3 and the abrasive grains 4, the sprayed abrasive grains 4 and scrapings (the support material 2) are held in the liquid 3 and prevented as much as possible from scattering outward, and even if the abrasive grains 4 are microscopic, for example, the abrasive grains 4 are carried by a large quantity of the liquid 3 to collide forcefully with the support material 2 located on the surface 1a of the three-dimensional object 1, and the support material 2 is therefore reliably removed by the scraping effect of the abrasive grains 4.

EXAMPLES

A specific example of the present invention is described based on the drawings.

The present example is a method for removing a support material 2 located on the surface 1a of a three-dimensional object 1, and is performed using a surface treatment device M which sprays a slurry 5 which is a mixture of a liquid 3 and abrasive grains 4, described hereinafter. The three-dimensional object 1 used as the treated object that is treated in the present example is a three-dimensional object 1 made of a synthetic resin (an ultraviolet-cured resin) molded by a three-dimensional forming device (commonly known as a 3D printer), and an alkali-soluble support material 2 is formed as a layer over the surface 1a of the three-dimensional object 1.

Specifically, this surface treatment device M has a slurry sprayer 6 installed inside a case body 16 as shown in FIG. 1, a slurry reservoir 15 installed in a position underneath the slurry sprayer 6, a slurry supplier 12 for supplying the slurry 5 from the slurry reservoir 15 to the slurry sprayer 6 via a slurry conveyor 12a, and a compressed air supplier 11 for supplying compressed air to the slurry sprayer 6 via a compressed air conveyor 11a; and the slurry 5 sprayed from the slurry sprayer 6 is sent to the slurry reservoir 15 and reused.

The slurry reservoir 15 can reserve a predetermined amount of the slurry 5, and a slurry stirring function (not shown) is provided for constantly stirring the slurry 5 inside the slurry reservoir 15.

The slurry sprayer 6 is configured from a slurry spraying base 10 and a spray nozzle 14 provided to the slurry spraying base 10 so as to be capable of being detached (capable of being separated), as shown in FIG. 1.

The slurry spraying base 10 is configured from a first member 10A and a second member 10B provided to the proximal end of the first member 10A so as to be capable of being detached (capable of being separated). In other words, the slurry sprayer 6 is separated into three parts.

Figure 3:
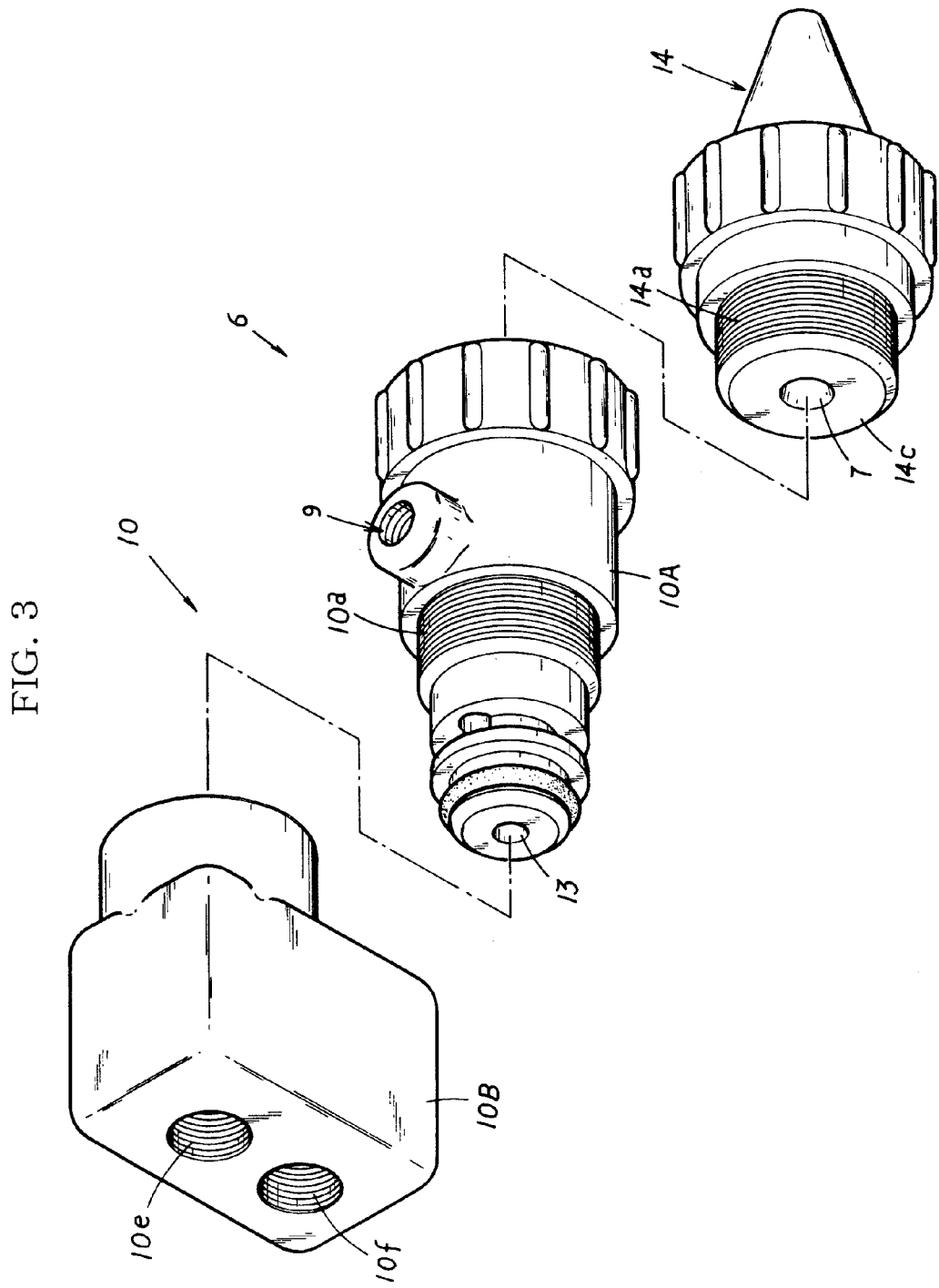
FIG. 3 is a partial exploded perspective view relating to the support material removing device used in the present example.
Figure 4:
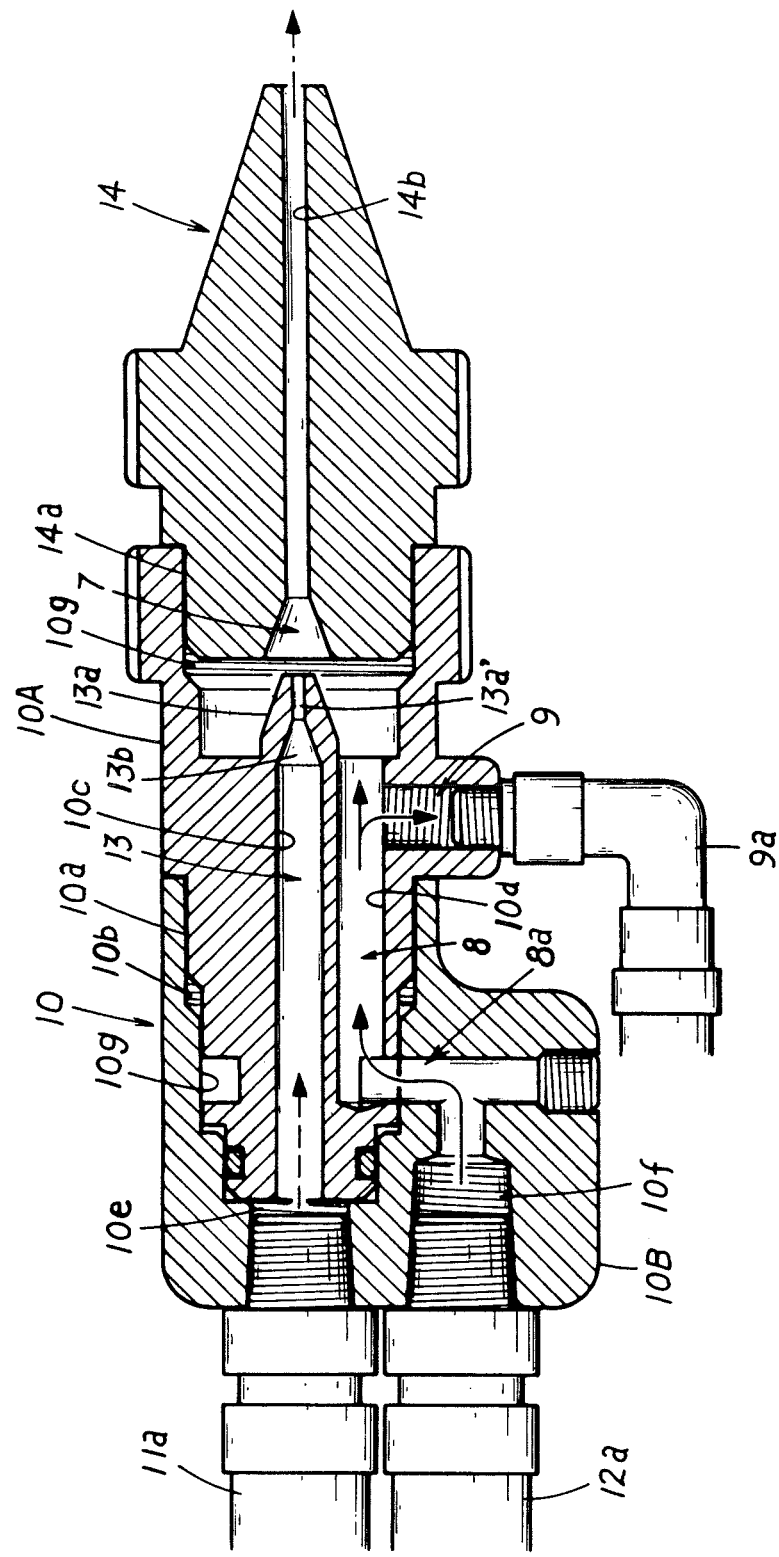
FIG. 4 is a partial explanatory cross-sectional view relating to the support material removing device used in the present example.

The first member 10A is a shaft-shaped object formed from a suitable synthetic resinous member (urethane resin) as shown in FIGS. 3 and 4, a screw part 10a which screws into a screw part 10b of the second member 10B is provided in the periphery in the center of the first member 10A, and the distal end is provided with a distal end space 10g which fits with and connects to the spray nozzle 14.

Inside the first member 10A, a pair of through-holes 10c, 10d circular in cross section are formed in alignment in the length direction (the axial direction), one through-hole 10c being communicated at the proximal end with a through-hole 10e of the second member 10B described hereinafter and constituting a compressed air passage 13 together with the through-hole 10e, the other through-hole 10d being communicated at the proximal end with a through-hole 10f of the second member 10B described hereinafter, communicated at the distal end with the distal end space 10g, and constituting a slurry passage 8 together with the through-hole 10f and distal end space 10g.

A tapered nozzle 13a which protrudes into the distal end space 10g is provided to the distal end of the compressed air passage 13, and a hole 13a' provided to this tapered nozzle 13a is provided so as to narrow to a smaller diameter via a taper hole part 13b.

Compressed air that has passed through the compressed air passage 13 is sprayed from the tapered nozzle 13a toward a spray slurry producer 7 described hereinafter, and the slurry 5 passing through the slurry passage 8 is drawn in by the compressed air and mixed in the spray slurry producer 7.

A bypass hole communicated with the exterior is formed in a predetermined position in the slurry passage 8, and this bypass hole is configured as a slurry outlet 9 for expelling some of the slurry 5 in order to increase the amount of slurry 5 supplied to the spray slurry producer 7.

Specifically, when an attempt to spray at a faster rate by the compressed air sprayed from the compressed air passage 13 is made by reducing the diameter of the nozzle hole 14b of the spray nozzle 14, a convection current arises in the spray slurry producer 7 because of the narrowing from the spray slurry producer 7 to the nozzle hole 14b, and there are cases in which the flow rate of the slurry 5 decreases and the abrasive grains 4 having mass are not easily drawn in, but the previously described problems are resolved in this respect by providing the slurry passage 8 with the slurry outlet 9.

The slurry outlet 9 is provided at a position as close as possible to the spray slurry producer 7, which in the present example is a position approximately 14 mm from the spray slurry producer 7.

The symbol 9a is a slurry return tube for returning the slurry 5 to the slurry reservoir 15.

A slurry outlet 9 is not provided to a type of first member 10A in which the nozzle hole 14b of the spray nozzle 14 has a large diameter, described hereinafter.

In the present example, a plurality (two) of first members 10A are provided, these members correspond to a plurality (two) of spray nozzles 14, and these members are designed with dimensions corresponding to the diameters of the nozzle holes 14b of the spray nozzles 14 and the taper angles of the spray slurry producers 7.

Figure 5:
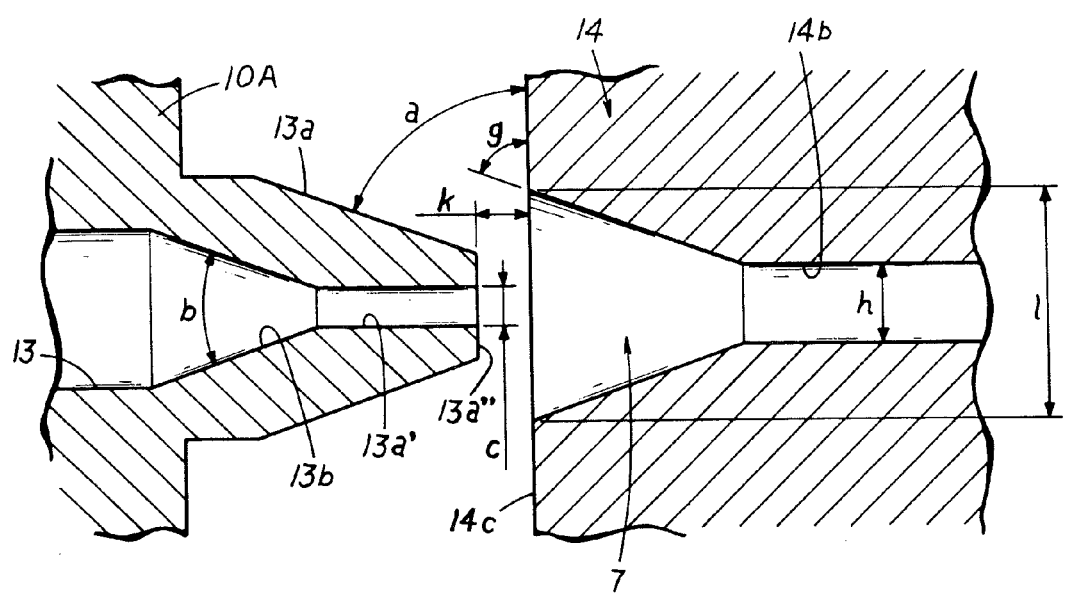
FIG. 5 is a partial explanatory cross-sectional view relating to the support material removing device used in the present example.

Specifically, in one first member 10A, as shown in FIG. 5, a taper angle a in the peripheral surface of the tapered nozzle 13a is set to 70 degrees relative to a proximal end vertical surface 14c of the spray nozzle 14 described hereinafter, a taper angle b of a tapered hole part 13b of the compressed air passage 13 is set to 40 degrees, a diameter c of the hole 13a' is set to 1.0 mm, and the diameter c of the hole 13a' is set to ½ the diameter h of the nozzle hole 14b of the spray nozzle 14.

Figure 6:
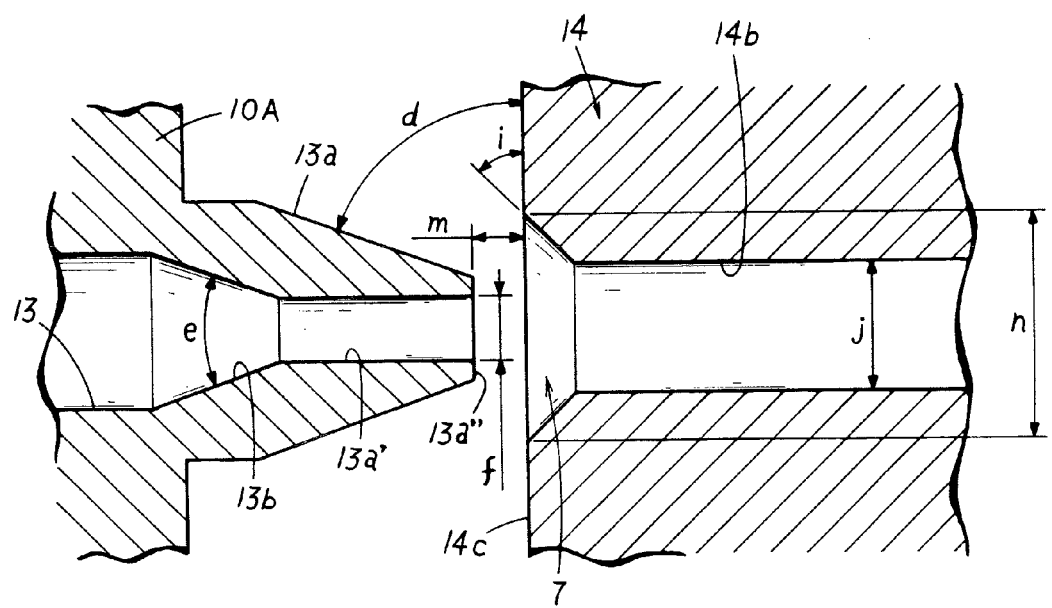
FIG. 6 is a partial explanatory cross-sectional view relating to the support material removing device used in the present example.

In the other first member 10A, as shown in FIG. 6, a taper angle d in the peripheral surface of the tapered nozzle 13a is set to 70 degrees relative to the proximal end vertical surface 14c of the spray nozzle 14, a taper angle e of the tapered hole part 13b of the compressed air passage 13 is set to 40 degrees, a diameter f of the hole 13a' is set to 1.7 mm, and the diameter f of the hole 13a is set to ½ the diameter j of the nozzle hole 14b of the spray nozzle 14.

The second member 10B is formed from a suitable synthetic resinous member (urethane resin) as shown in FIGS. 3 and 4, wherein the distal end space 10g that fits over the proximal end of the first member 10A is provided to the distal end, and a screw part 10b that threads over the screw part 10a provided to the first member 10A is provided to this distal end space 10g, as shown in FIGS. 3 and 4.

The second member 10B has the pair of through-holes 10e, 10f formed in its interior, the compressed air conveyor 11a is connected to one through-hole 10e, and the slurry conveyor 12a is connected to the other through-hole 10f.

The through-hole 10f is in communication with the through-hole 10d of the first member 10A to constitute the slurry passage 8 as previously described, and a crank-shaped part 8a is provided to the slurry passage 8.

The crank-shaped part 8a is configured by making the through-hole 10f not straight and providing a corner that bends at a right angle.

When the through-hole 10f is provided in practice, it is provided by forming two orthogonal holes in the second member 10B which is a molded product made of a synthetic resin, and blocking up one hole as a waste hole.

By providing the crank-shaped part 8a to the slurry passage 8, the overall length of the slurry sprayer 6 can be shortened and the sprayer can be made as compact as possible.

The spray nozzle 14 is a shaft-shaped object formed from a suitable synthetic resinous member (urethane resin) as shown in FIGS. 3 and 4, and a screw part 14a which threads into the first member 10A is formed on the peripheral surface of the proximal end of the spray nozzle 14.

The spray nozzle 14 has a through-hole formed, which is configured as the nozzle hole 14b for spraying the spray slurry produced by the spray slurry producer 7.

The spray slurry producer 7 is in communication at the distal end with the proximal end of the nozzle hole 14b as shown in FIG. 4, and the proximal end is provided with a taper hole which opens in the proximal end vertical surface 14c of the spray nozzle 14.

In the present example, a plurality (two) of spray nozzles 14 are provided, these nozzles correspond to a plurality (two) of first members 10A, and these nozzles are designed with dimensions corresponding to the taper angles a and d of the tapered nozzles 13a pertaining to the first members 10A, the table angles b and e of the tapered hole part 13b of the compressed air passage 13, and the diameters c and f of the hole 13a'.

Specifically, in one spray nozzle 14, as shown in FIG. 5, the taper angle g in the tapered hole constituting the spray slurry producer 7 is set to 70 degrees relative to the proximal end vertical surface 14c of the spray nozzle 14, and the diameter h of the nozzle hole 14b is set to 2.0 mm.

In the case of the slurry sprayer 6 made of a combination of the first member 10A and the spray nozzle 14 shown in FIG. 5, the space k between the distal end surface 13a" of the tapered nozzle 13a and the proximal end vertical surface 14c of the spray nozzle 14 is set to 0.5 mm, and the maximum diameter l of the spray slurry producer 7 is set to 10 mm.

In the other spray nozzle 14, as shown in FIG. 6, the taper angle i in the tapered hole constituting the spray slurry producer 7 is set to 45 degrees relative to the proximal end vertical surface 14c of the spray nozzle 14, and the diameter j of the nozzle hole 14b is set to 3.4 mm.

In the case of the slurry sprayer 6 made of a combination of the first member 10A and the spray nozzle 14 shown in FIG. 6, the space m between the distal end surface 13a" of the tapered nozzle 13a and the proximal end vertical surface 14c of the spray nozzle 14 is set to 0.5 mm, and the maximum diameter n of the spray slurry producer 7 is set to 6 mm.

By setting the various angles and dimensions in the previously described first member 10A and spray nozzle 14, turbulent flows in the slurry 5 are inhibited and satisfactory spraying is achieved. This has been confirmed by experimenting.

A pump device with a 100 V power source is used as the slurry supplier 12 used in the present example.

This pump device is made of a urethane resin in various places (e.g. the casing portion), improving abrasion resistance.

A compressor with a 100 V power source is used as the compressed air supplier 11 used in the present example.

The slurry 5 used in the present example is a mixture of the liquid 3 and the particulate abrasive grains 4.

Resinous abrasive grains 4 are used as the abrasive grains 4, which are formed into columnar shapes approximately 0.3 mm in diameter and approximately 0.3 mm in height. It is confirmed through experimenting that the size of the abrasive grains 4 is preferably approximately 0.1 to 0.5 mm in diameter and approximately 0.1 to 0.5 mm in height.

The reason that the abrasive grains 4 are given columnar shapes is because when the peripheral surfaces of the abrasive grains 4 have numerous angles, they scrape into the base material (the surface 1a of the three-dimensional object 1), but when there are no angles in the peripheral surfaces of the abrasive grains 4, the scraping effect is insufficient. In view of this, in the present example, it was confirmed that giving the grains columnar shapes makes it possible for the support material 2 to be satisfactorily removed by the scraping effect.

The symbol 17 indicates a carrying stand for carrying the three-dimensional object 1.

The following is a description of the method of removing the support material 2 in the three-dimensional object 1 using the surface treatment device M having the configuration described above.

The slurry 5, which is a mixture of the liquid 3 and the abrasive grains 4, is sprayed from the slurry sprayer 6 onto the three-dimensional object 1 molded by the three-dimensional forming device.

Figure 2:
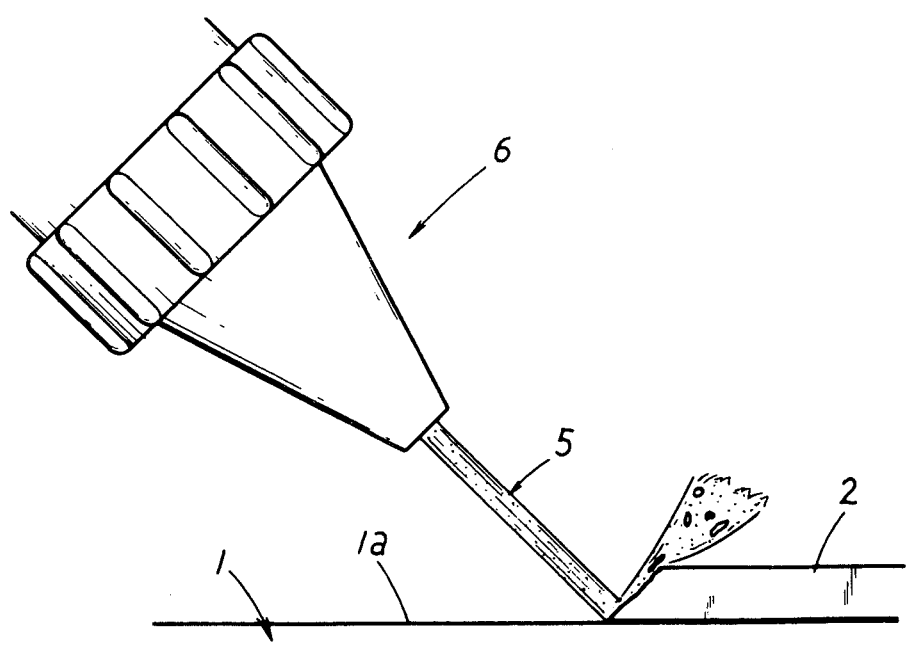
FIG. 2 is an enlarged explanatory drawing showing the support material removing method according to the present example.

At this time, the abrasive grains 4 constituting the slurry 5 are carried by the liquid 3 and made to collide with the support material 2 located on the surface 1a of the three-dimensional object 1, and the support material 2 is satisfactorily removed by the collision with the abrasive grains 4 (see FIG. 2).

Due to the scraping effect of the abrasive grains 4 in the slurry 5, clumped support material 2 located on the surface 1a of the three-dimensional object 1, for example, is of course removed, slipperiness that readily remains on the surface 1a of the three-dimensional object 1 (a thin film of remaining support material 2) can also be reliably removed, and the support material 2 is reliably removed also from locations where it had not come off easily in conventional practice (gaps and corners) by actively achieving the scraping effect in these locations.

Since the present example is designed as described above, the support material 2 located on the surface 1a of the three-dimensional object 1 can be removed quickly, reliably, and easily.

In the present example, to perform the surface treatment on the three-dimensional object 1 by spraying the slurry 5 which is a mixture of the liquid 3 and the abrasive grains 4, the sprayed abrasive grains 4 and scrapings (the support material 2) are held in the liquid 3 and prevented as much as possible from scattering outward, and even if the abrasive grains 4 are microscopic, for example, the abrasive grains 4 are carried by a large quantity of the liquid 3 to collide forcefully with the support material 2 located on the surface 1a of the three-dimensional object 1, and the support material 2 is therefore reliably removed by the scraping effect of the abrasive grains 4.

In the slurry sprayer 6 of the present example, the spray nozzle 14 for spraying the slurry 5 produced by the spray slurry producer 7 is provided in a detachable manner to the slurry spraying base 10 which is provided with the slurry passage 8 and the compressed air passage 13 through which compressed air passes; therefore, by preparing spray nozzles 14 of various dimensions, for example, the removal of the support material 2 can be adapted to various applications including spraying over a wide area, spraying over a narrow area, etc.

In the present example, since the slurry passage 8 is provided with the crank-shaped part 8a, the entire slurry sprayer 6 can be made more compact.

In the present example, since the slurry passage 8 is provided with the slurry outlet 9 for expelling some of the slurry 5, the slurry 5 can be reliably drawn into and mixed in the spray slurry producer 7 to produce the spray slurry.

In the present example, since columnar abrasive grains 4 are used as the abrasive grains 4, the support material 2 can be removed reliably and satisfactorily without scratching the surface 1a of the three-dimensional object 1.

In the present example, since the abrasive grains 4 are approximately 0.1 to 0.5 mm in diameter and approximately 0.1 to 0.5 mm in height, the support material 2 can be removed reliably and satisfactorily with specific numerical values having been set.

In the present example, since abrasive grains 4 made of a comparatively soft resin are used as the abrasive grains 4, the support material 2 can be removed reliably and satisfactorily without scratching the surface 1a of the three-dimensional object 1 in this respect as well.

The present invention is not limited to the present example, and the specific configurations of the configurational elements can be designed as appropriate.

The invention claimed is:

1. A support material removing method for removing a support material on a surface of a three-dimensional object molded by a three-dimensional forming device, comprising:

spraying a slurry, which is a mixture of a liquid and abrasive grains, from a slurry sprayer including a spray nozzle, to remove the support material from the surface of the three-dimensional molded object, said spray nozzle made of resin and configured to be detachably attached to a slurry spraying base made of resin, said slurry spraying base including a compressed air passage and a slurry passage having a right-angle bent portion, wherein the slurry supplied from a slurry supplier passes through the compressed air passage with compressed air supplied from a compressed air supplier, and said spray nozzle including a spray slurry producer for mixing the compressed air with the slurry, which is drawn in through the slurry passage by passing the compressed air, and expelling some of the slurry passing through the slurry passage using a slurry outlet, said slurry outlet disposed in a position upstream of and near to the spray slurry producer, and said abrasive grains are columnar-shaped, approximately 0.1 to 0.5 mm in diameter, and approximately 0.1 to 0.5 mm in height, and made of resin.

* * * * *